(12) United States Patent
Chang et al.

(10) Patent No.: US 8,520,376 B2
(45) Date of Patent: Aug. 27, 2013

(54) LIQUID CRYSTAL DISPLAY DEVICE

(75) Inventors: Kuk-Hui Chang, Gyeonggi-do (KR); Young-Nam Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 203 days.

(21) Appl. No.: 12/887,970

(22) Filed: Sep. 22, 2010

(65) Prior Publication Data

US 2011/0069432 A1 Mar. 24, 2011

(30) Foreign Application Priority Data

Sep. 24, 2009 (KR) ........................ 10-2009-0090589

(51) Int. Cl.
*H05K 5/00* (2006.01)
*H05K 7/00* (2006.01)
*G06F 1/16* (2006.01)
*G02F 1/1333* (2006.01)

(52) U.S. Cl.
USPC ................. 361/679.21; 361/679.01; 349/56

(58) Field of Classification Search
USPC ................ 361/679.01, 679.21; 349/56, 58, 349/59, 60, 150
See application file for complete search history.

(56) References Cited

U.S. PATENT DOCUMENTS 6,050,830 A * 4/2000 Tanaka ........................... 439/67
7,944,682 B2 * 5/2011 Park et al. ................ 361/679.21
8,035,238 B2 * 10/2011 Kim et al. ..................... 257/797
2007/0284763 A1 * 12/2007 Kim et al. ..................... 257/797
2009/0168314 A1 * 7/2009 Park et al. ................ 361/679.02

FOREIGN PATENT DOCUMENTS

CN 101086588 A 12/2007

OTHER PUBLICATIONS

Chinese Office Action issued in corresponding Chinese Patent Application No. 201010269249.4 dated Mar. 31, 2012.

* cited by examiner

*Primary Examiner* — Anthony Haughton
(74) *Attorney, Agent, or Firm* — Morgan, Lewis & Bockius LLP

(57) ABSTRACT

A liquid crystal display device is disclosed, by which misalignment between a tape carrier package and a panel can be prevented in a manner of forming an align mark between output pads provided to a central part of the tape carrier package. The present invention includes a panel having a display unit configured to display an image and a non-display unit configured to enclose the display unit, at least one drive integrated circuit generating various kinds of signals required for displaying the image on the display unit of the panel, a tape carrier package having the drive integrated circuit loaded thereon, the tape carrier package having a plurality of input patterns for connecting input pins of the drive integrated circuit to an external circuit and a plurality of output patterns for connecting output pins of the drive integrated circuit to the panel, and at least one first center align mark provided to the tape carrier package to be located between the input patterns adjacent to each other or between the output patterns adjacent to each other, the at least one first center align mark used to align the panel and the tape carrier package with each other.

7 Claims, 5 Drawing Sheets

LIQUID CRYSTAL DISPLAY DEVICE

This application claims the benefit of the Korean Patent Application No. 10-2009-0090589, filed on Sep. 24, 2009, which is hereby incorporated by reference as if fully set forth herein.

BACKGROUND OF THE INVENTION

1. Field of the Invention

The present invention relates to a liquid crystal display device. Although the present invention is suitable for a wide scope of applications, it is particularly suitable for preventing misalignment between a tape carrier package and a panel in a manner of forming an align mark between output pads provided to a central part of the tape carrier package.

2. Discussion of the Related Art

Generally, a liquid crystal display device displays an image in a manner of adjusting light transmittance of liquid crystals using an electric field. For this, the liquid crystal display device includes a liquid crystal display panel, on which pixel regions are arranged in a matrix form, and a drive circuit for driving the liquid crystal display panel.

In order to drive data lines of the liquid crystal display panel, a data drive integrated circuit is necessary. The data drive integrated circuit is bonded to the liquid crystal display panel in a manner of being loaded on a data tape carrier package. In this bonding work, the liquid crystal display panel and the data tape carrier package should be aligned with each other first. For this, align marks are formed on both edges of the data tape carrier package.

However, even if output pads located on the edges of the data tape carrier package are correctly aligned with pads located on the edges of the liquid crystal display panel using the align marks, output pads, which are provided to the central part and have widths smaller than those of the output pads located on the edges to reduce resistance deviation, may not be aligned with the pads provided to the central part of the liquid crystal display panel. In particular, even if the aligned state on the edges lie within an allowable error range, since the line widths of the output pads provided to the central part are smaller than those of the output pads located on the edges, misalignment between the output pads provided to the central part and the liquid crystal display panel is frequently generated.

SUMMARY OF THE INVENTION

Accordingly, the present invention is directed to a liquid crystal display device that substantially obviates one or more problems due to limitations and disadvantages of the related art.

An object of the present invention is to provide liquid crystal display device, by which misalignment between a tape carrier package and a panel can be prevented in a manner of forming an align mark between output pads provided to a central part of the tape carrier package.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device according to the present invention includes a panel having a display unit configured to display an image and a non-display unit configured to enclose the display unit, at least one drive integrated circuit generating various kinds of signals required for displaying the image on the display unit of the panel, a tape carrier package having the drive integrated circuit loaded thereon, the tape carrier package having a plurality of input patterns for connecting input pins of the drive integrated circuit to an external circuit and a plurality of output patterns for connecting output pins of the drive integrated circuit to the panel, and at least one first center align mark provided to the tape carrier package to be located between the input patterns adjacent to each other or between the output patterns adjacent to each other, the at least one first center align mark used to align the panel and the tape carrier package with each other.

Preferably, each of the output patterns includes an input pad provided to an input pad part located at one end portion of the tape carrier package, an input line connecting the input pad and the input pin to each other, an output pad provided to the other end portion of the tape carrier package, and an output line connecting the output pad and the output pin to each other.

More preferably, the first center align mark is provided to the output pad part of the tape carrier package to be located between two random output pads adjacent to each other.

More preferably, the first center align mark is provided to the tape carrier package to be located between two random output lines adjacent to each other.

Preferably, each of the output patterns has a same color and the first center align mark and the output pattern differ from each other in color.

More preferably, the color of the first center align mark and the color of the output pattern complement each other.

Preferably, the display device further includes a first left align mark provided to an edge of one side of the tape carrier package and a first right align mark provided to an edge of the other side of the tape carrier package.

More preferably, the display device further includes a second center align mark provided to the non-display unit to be aligned with the first center align mark, a second left align mark provided to the non-display unit to be aligned with the first left align mark, and a second right align mark provided to the non-display unit to be aligned with the first right align mark.

In this case, each of the output patterns has a same color and wherein the second center align mark and the output pattern differ from each other in color. And, the color of the second center align mark and the color of the output pattern complement each other.

Accordingly, the present invention provides the following effects and/or advantages.

First of all, the present invention forms an align mark between output pads located in the central part of a tape carrier package, thereby preventing misalignment between a panel and output pads located in the central part with small line width.

Secondly, a color of the align mark located in the central part is made to differ from that of the output patterns, thereby facilitating a user to identify the align mark. Therefore, the present invention raises efficiency of work and accuracy of alignment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
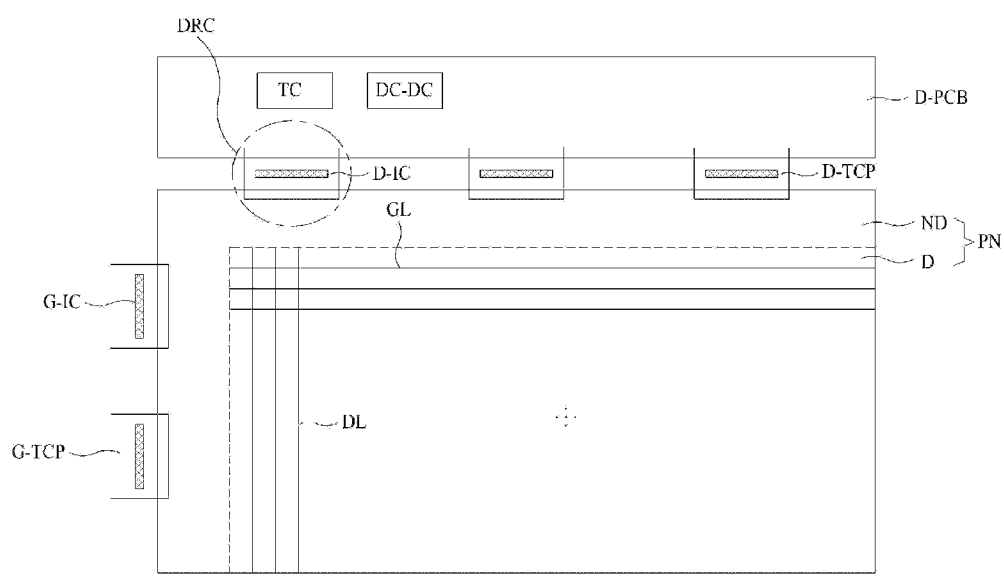
FIG. 1 is a layout of a liquid crystal display device according to a first embodiment of the present invention.
Figure 2:
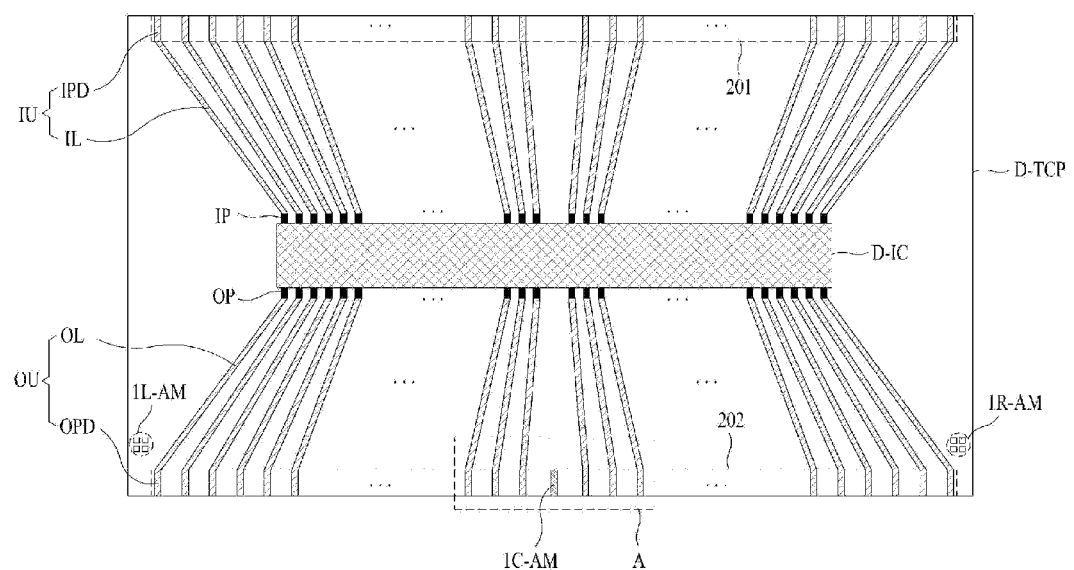
FIG. 2 is a diagram of a tape carrier package shown in FIG. 1 and a drive integrated circuit loaded thereon.

FIG. 1 is a layout of a liquid crystal display device according to a first embodiment of the present invention, and FIG. 2 is a diagram of a tape carrier package shown in FIG. 1 and a drive integrated circuit loaded thereon, in which a prescribed data tape carrier package and a data drive integrated circuit (D-IC) loaded thereon are exemplarily shown.

Referring to FIG. 1 and FIG. 2, a liquid crystal display device according to a first embodiment of the present invention includes a panel PN having a display unit D configured to display an image and a non-display unit ND configured to enclose the display unit D, at least one data drive integrated circuit D-IC generating various kinds of signals required for displaying the image on the display unit D of the panel PN, a data tape carrier package D-TCP having the data drive integrated circuit D-IC loaded thereon, the data tape carrier package D-TCP having a plurality of input patterns IU for connecting input pins IP of the data drive integrated circuit D-IC to an external circuit and a plurality of output patterns OU for connecting output pins OP of the data drive integrated circuit D-IC to the panel PN, and at least one first center align mark 1C-AM provided to the data tape carrier package D-TCP to be located between the input patterns IU adjacent to each other or between the output patterns OU adjacent to each other, the at least one first center align mark 1C-AM used to align the panel PN and the data tape carrier package D-TCP with each other.

The liquid crystal display device according to the first embodiment of the present invention, as shown in FIG. 1, further includes a data printed circuit board D-PCB electrically connected to the panel PN by the data tape carrier package D-TCP, a timing controller TC provided to the data printed circuit board D-PCB, a DC-to-DC converting unit DC-DC provided to the data printed circuit board D-PCB, a plurality of gate drive integrated circuits G-IC configured to drive gate lines GL provided to the panel PN, and a gate tape carrier package G-TCP having each of the gate drive integrated circuits G-IC loaded thereon.

The timing controller TC generates a data control signal and a gate control signal using a horizontal sync signal, a vertical sync signal and a clock signal provided by a system and then supplies the generated signals to a plurality of the data drive integrated circuits D-IC and a plurality of the gate drive integrated circuits G-IC. In this case, the data control signal includes a dot clock, a source shift clock, a source enable signal, a polarity invert signal and the like. And, the gate control signal includes a gate start pulse, a gate shift clock, a gate output enable and the like.

The data drive integrated circuits D-IC samples data according to the data control signal from the timing controller TC, latches the sampled data by 1 line at every horizontal times (1H, 2H, . . . ), and then supplies the latched data to the data lines. In particular, the data drive integrated circuits D-IC converts the data from the timing controller TC to analog pixel signals using the gamma voltage inputted from a gamma voltage generating unit and then supplies the analog pixel signal to the data lines.

Each of the gate drive integrated circuits G-IC includes a shift register sequentially generating a scan pulse in response to the gate start pulse of the gate control signal from the timing controller TC and a level shifter configured to shift a voltage of the scan pulse to a voltage level suitable for driving a liquid crystal cell. The gate drive integrated circuits G-IC sequentially supply gate high voltages to the gate lines GL in response to the gate control signal.

The DC-to-DC converting unit DC-DC raises or lowers the voltage of a power source from a system and then provides various drive voltages required for the timing controller TC, the data drive integrated circuits D-IC and the gate drive integrated circuits G-IC and a gamma reference voltage required for generating the gamma voltage and the like. The DC-to-DC converting unit DC-DC provides a gate high voltage corresponding to a high voltage of the scan pulse and a gate low voltage corresponding to a low voltage of the scan pulse.

The data tape carrier package D-TCP, as shown in FIG. 2, includes a plurality of input patterns IU and a plurality of output patterns OU.

The input patterns IU are provided to connect the input pins IP of the data drive integrated circuit D-IC to an external circuit such as the timing controller, the DC-to-DC converting unit DC-DC and the like. Each of the input patterns IU includes an input pad IPD provided to an input pad part 201 located at one end portion of the data tape carrier package D-TCP and an input line IL connecting the input pad IPD to the input pin IP.

The output patterns OU are provided to connect the output pins OP of the data drive integrated circuit D-IC to the panel PN, and more particularly, to the data lines of the panel PN. Each of the output patterns OU includes an output pad OPD provided to an output pad part 202 located at the other end portion of the data tape carrier package D-TCP and an output line OL connecting the output pad OPD to the output pin OP.

The data tape carrier package D-TCP further includes a first left align mark 1L-AM provided to an edge of one side of the data tape carrier package and a first right align mark 1R-AM provided to an edge of the other side of the data tape carrier package. The first left and right align marks 1L-AM and 1R-AM are used to align the panel PN and the data tape carrier package D-TCP together with the aforesaid first center align mark 1C-AM. In particular, a second center align mark ('2C-AM' in FIG. 6), a second left align mark ('2L-AM' in FIG. 6) and a second right align mark ('2R-AM' in FIG. 6) are provided to the non-display unit ND of the panel PN. The second center align mark is provided to the non-display unit ND of the panel PN to be aligned with the first center align mark 1C-AM, the second left align mark 2L-AM is provided to the non-display unit ND of the panel PN to be aligned with the first left align mark 1L-AM, and the second right align mark 2R-AM is provided to the non-display unit ND of the panel PN to be aligned with the first right align mark 1R-AM.

The above described align marks are used to align the panel PN and the data tape carrier package D-TCP with each other during a step of bonding the panel PN and the data tape carrier package D-TCP together.

The first center align mark 1C-AM is provided to the tape carrier package to be located between two random output patterns OU adjacent to each other. The location of the first center align mark 1C-AM is further described in detail as follows.

Figure 3:
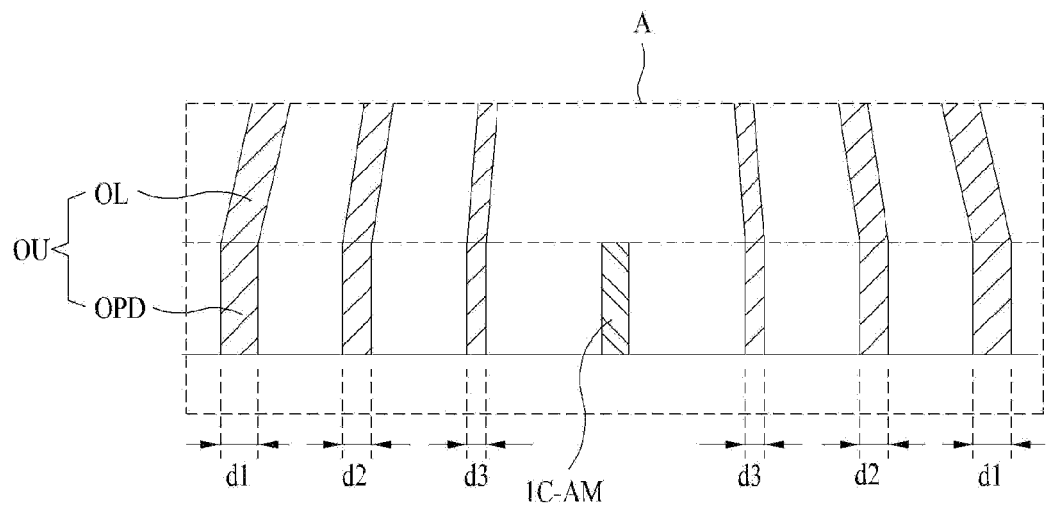
FIG. 3 is an enlarged diagram of a part-A shown in FIG. 2.

FIG. 3 is an enlarged diagram of a part-A shown in FIG. 2.

Referring to FIG. 3, the first center align mark 1C-AM is provided to the output pad part 202 of the tape carrier package to be located between two random output pads OPD adjacent to each other.

Figure 4:
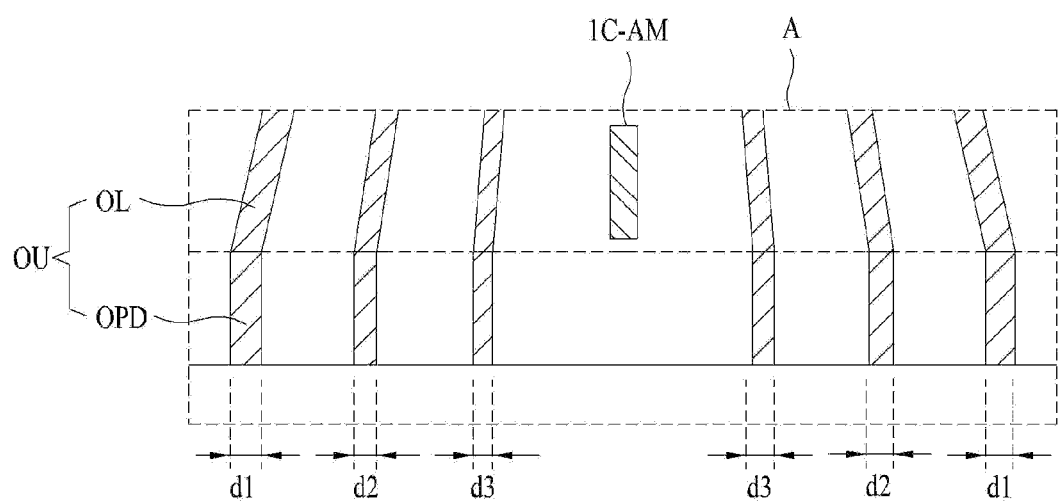
FIG. 4 is an enlarged diagram of another example for the part-A shown in FIG. 2.

According to another embodiment, the structure shown in FIG. 4 can be proposed.

FIG. 4 is an enlarged diagram of another example for the part-A shown in FIG. 2.

Referring to FIG. 4, the first center align mark 1C-AM is provided to the tape carrier package to be located between two random output lines OL adjacent to each other.

Meanwhile, referring to FIG. 3 and FIG. 4, in order to minimize resistance deviation between output lines OL, a size of the output line OL or the output pad OPD closer to an edge of the data tape carrier package D-TCP tends to increase, whereas a size of the output line OL or the output pad OP closer to a central part of the data tape carrier package D-TCP tends to decrease. As the output line OL is located closer to the edge of the data tape carrier package D-TCP, a length of the output line OL increases. As the output line OL is located closer to the central part of the data tape carrier package D-TCP, a length of the output line OL decreases. Thus, the resistance deviation between the output lines OL according to the deviation can be minimized. This structure is identically applied to the input lines IL and the input pads IPD.

For instance, referring to FIG. 3, it can be observed that widths d1, d2 and d3 of the output pads OPD differ from one another. In particular, the width d3 of the output pad OPD closest to the central part is the greatest, while the width d1 of the output pad OPD farthest from the central part is the smallest.

According to the present invention, in order for a first center align mark 1C-AM to be well seen, the first center align mark 1C-AM can be made to have a color. In particular, the first center align mark 1C-AM is set to have a color different from that of each output pattern OU, thereby being distinguishably seen. For this, the color of the first center align mark 1C-AM and the color of the output pattern OU can be set to complement each other. For instance, a red is given to the first center align mark 1C-AM, while a green, which complements the red, is given to all of the output patterns OU. Therefore, a worker is facilitated to recognize the first center align mark 1C-AM.

In this case, a second center align mark 2C-AM can be set to have the same color of the first center align mark 1C-AM.

Meanwhile, another center align mark (hereinafter named a third center align mark) can be provided between output patterns OU. In particular, the third center align mark can be provided to the input pad part 201 of the tape carrier package to be located between two random input pads IPD adjacent to each other. Alternatively, the third center align mark can be provided to the tape carrier package in a manner of being located between two random input lines IL adjacent to each other. The third center align mark is usable in aligning a data printed circuit board D-PCB and a data carrier package with each other. In this case, a fourth center align mark can be further provided to the data printed circuit board D-PCB to be aligned with the third center align mark.

Figure 5:
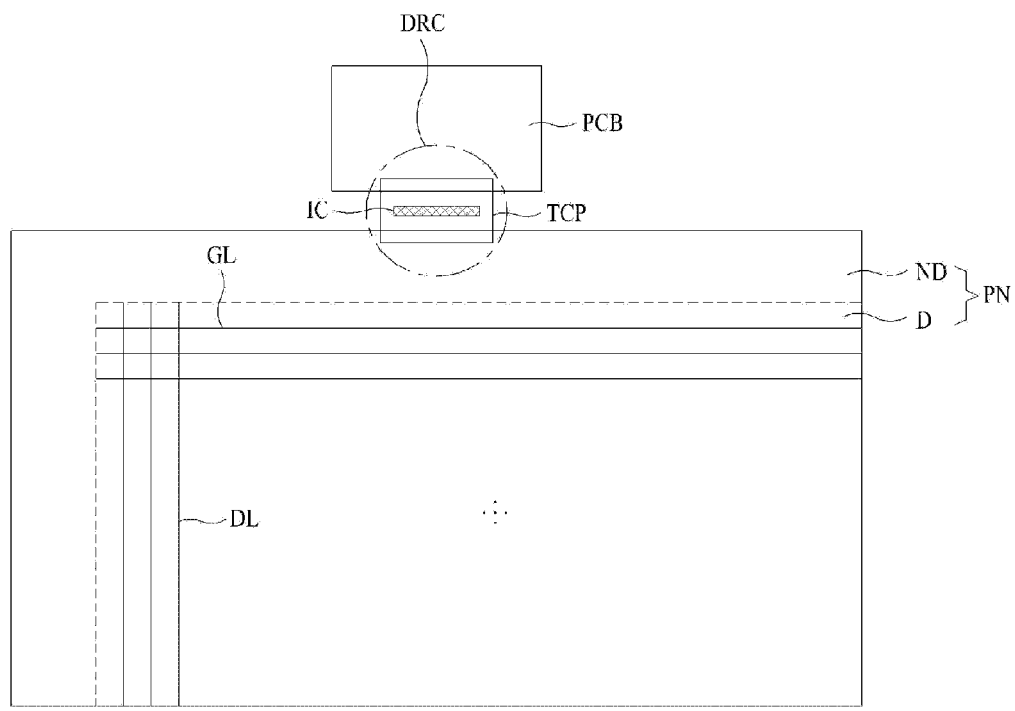
FIG. 5 is a layout of a liquid crystal display device according to a second embodiment of the present invention.

FIG. 5 is a layout of a liquid crystal display device according to a second embodiment of the present invention.

Referring to FIG. 5, a liquid crystal display device according to a second embodiment of the present invention includes a panel PN having a display unit D configured to display an image and a non-display unit ND configured to enclose the display unit D, a combined drive integrated circuit IC generating various kinds of signals required for displaying the image on the display unit D of the panel PN, a combined tape carrier package having a plurality of input patterns IU for connecting input pins IP of the combined drive integrated circuit IC to an external circuit and a plurality of output patterns OU for connecting output pins OP of the combined drive integrated circuit IC to the panel PN, and at least one first center align mark 1C-AM provided to the combined tape carrier package TCP to be located between the input patterns IU adjacent to each other or between the output patterns OU adjacent to each other, the at least one first center align mark 1C-AM used to align the panel PN and the combined tape carrier package D-TCP with each other.

Functions of the aforesaid gate drive integrated circuit G-IC, the data drive integrated circuit, the timing controller and the DC-to-DC converter are combined in the combined drive integrated circuit IC. In particular, the combined drive integrated circuit IC performs the functions of the timing controller and the DC-to-DC converter and also performs the function of the gate drive integrated circuit G-IC for driving the gate lines GL and the function of the data drive integrated circuit D-IC for driving the data lines.

The combined tape carrier package TCP having the combined drive integrated circuit IC loaded therein has the same configuration of the former data tape carrier package D-TCP of the aforesaid first embodiment. In particular, a location of the first center align mark 1C-AM provided to the combined tape carrier package TCP, as shown in FIG. 3 or FIG. 4, can be limited. And, the combined tape carrier package TCP includes a first left align mark 1L-AM at one edge and a first right align mark 1R-AM at the other edge.

The first center align mark 1C-AM of the liquid crystal display device according to the second embodiment of the present invention can have the same color of the former first center align mark of the first embodiment. And, the combined tape carrier package TCP of the second embodiment can further include the aforesaid third center align mark as well.

In FIG. 5, a reference number 'PCB' indicates a combined printed circuit board that provides various signals from a system to the combined drive integrated circuit IC.

According to the first or second embodiment, the panel PN can include one of a liquid crystal panel using liquid crystals as a medium of display, a light emitting panel using a light emitting diode as a medium of display, and a plasma panel using plasma as a medium of display.

Figure 6:
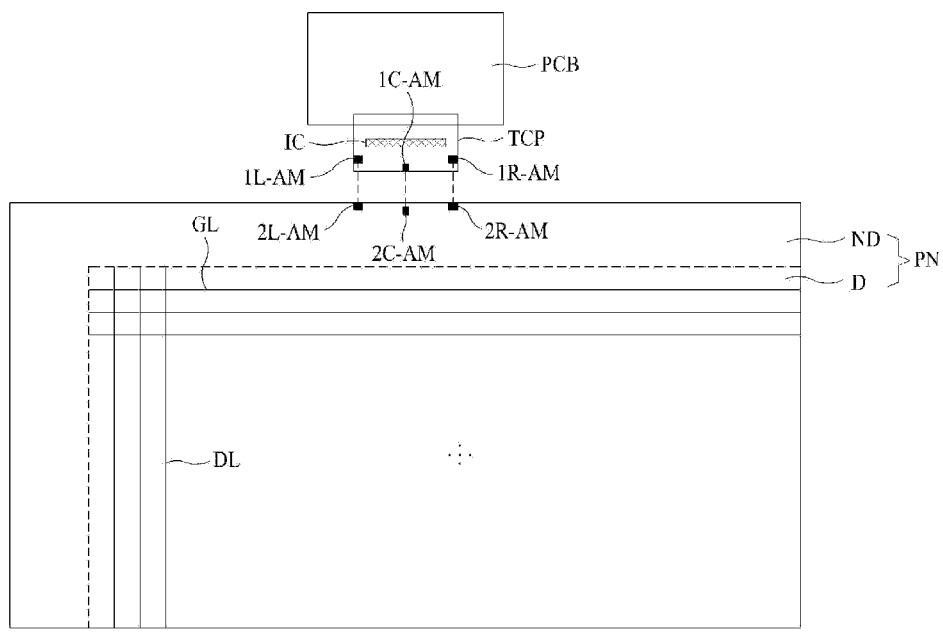
FIG. 6 is a layout for describing a work of alignment between a panel and a combined drive integrated circuit shown in FIG. 5.

FIG. 6 is a layout for describing a work of alignment between a panel and a combined drive integrated circuit shown in FIG. 5.

Referring to FIG. 6, a first left align mark 1L-AM opposes a first right align mark 1R-AM, a second left align mark 2L-AM opposes a second right align mark 2R-AM, and a first center align mark 1C-AM opposes a second center align mark 2C-AM.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
   a panel having a display unit configured to display an image and a non-display unit configured to enclose the display unit;
   at least one drive integrated circuit generating various kinds of signals required for displaying the image on the display unit of the panel;
   a tape carrier package having the drive integrated circuit loaded thereon, the tape carrier package having a plurality of input patterns for connecting input pins of the drive integrated circuit to an external circuit and a plurality of output patterns for connecting output pins of the drive integrated circuit to the panel; and
   at least one first center align mark provided to the tape carrier package to be located between the output patterns adjacent right to each other, the at least one first center align mark used to align the panel and the tape carrier package with each other;
   wherein each of the output patterns comprising an output pad provided to an output pad part of the tape carrier package and an output line connecting the output pad and the output pin to each other;
   wherein the first center align mark is formed on the output pad part of the tape carrier package to be located between two random output pads adjacent to each other.

2. The display device of claim 1, wherein each of the output patterns has a same color and wherein the first center align mark and the output pattern differ from each other in color.

3. The display device of claim 2, wherein the color of the first center align mark and the color of the output pattern complement each other.

4. The display device of claim 1, further comprising:
   a first left align mark provided to an edge of one side of the tape carrier package; and
   a first right align mark provided to an edge of the other side of the tape carrier package.

5. The display device of claim 4, further comprising:
   a second center align mark provided to the non-display unit to be aligned with the first center align mark;
   a second left align mark provided to the non-display unit to be aligned with the first left align mark; and
   a second right align mark provided to the non-display unit to be aligned with the first right align mark.

6. The display device of claim 5, wherein each of the output patterns has a same color and wherein the second center align mark and the output pattern differ from each other in color.

7. The display device of claim 6, wherein the color of the second center align mark and the color of the output pattern complement each other.

* * * * *